UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS AND FIRE-BRICK.

SPECIFICATION forming part of Letters Patent No. 265,074, dated September 26, 1882.

Application filed September 1, 1882. (No specimens.)

*To all whom it may concern:*

Be it known that I, JAMES HENDERSON, of Bellefonte, county of Centre, State of Pennsylvania, (formerly of New York city,) have invented a new and useful Improvement in Compounds for Furnace-Linings and Fire-Brick, of which the following is a specification such as will enable those skilled in the art to understand and make the same.

This invention relates to the formation of a compound for furnace-linings and fire-brick, consisting of silica in a finely-divided state and small proportions of magnesian lime, which with water forms a binding agent.

Before this my invention brick have been made of sand and lime in various proportions for building purposes, and linings for furnaces, many of which are unfit for high temperatures on account of the large amount of lime present, and those in which but two to ten per cent. of lime is used, are very friable and become greatly injured in handling.

The object of this invention is to combine such proportions of silica and magnesian lime as will serve as a binding material, and at the same time will be refractory and hard and firm in its composition, and will neither expand nor contract at any temperature.

In carrying out this my invention I use washed river-sand—such as is used for covering the hearths of iron-heating furnaces—which is free from oxide of iron, or pulverized sandstone—such as is used in the manufacture of glass. The sand may be used as found; but I prefer to grind it to the fineness of flour. To the silica I add magnesian lime, which should be as free as possible from other substances that will form fusible compounds with the silica and lime of the magnesian lime. The magnesian lime should be calcined and hydrated with water and dried and reduced to a fine flour. This is added to the silica in such proportion to make about four (4) to five (5) per cent. of magnesian lime, by weight, to the mixture. These are preferably mixed in the dry state and sufficient water added to make the mass cohere; or the lime may be mixed with the water to the consistency of milk of lime and be mixed with the sand to form a thick mortar. In this condition it may be added to the furnace-hearth or other metallurgical vessel, and becomes solid and hardened when dried at the ordinary temperature, or when exposed to high temperatures, and can be advantageously applied as a lining for vertical walls, or to form them of it entire. It is an economical substitute for fire-brick, and does not, by reason of the proportions, expand or contract when exposed to the high temperatures of a steel melting furnace, and will set into a hard, compact, non-friable mass when dried.

The above-described compound may be molded into brick and dried at the ordinary temperature and be fit for use, or burned in kilns and used as linings in the form of brick. Lime—such as contains large proportions of magnesia—produced from the purest dolomites of Springfield, Ohio, and which has been preferably calcined below redness and slaked or hydrated with water, is preferred for this purpose, as the magnesia and lime it contains are nearly pure, gives it binding qualities, and causes it to harden upon mixture with water and exposure to the air.

I do not wish to limit myself to the proportions of silica and magnesian lime as hereinbefore given, as useful refractory compounds may be made containing from two and one-half to ten per cent. of magnesian lime.

Magnesian lime is a compound of magnesia and lime in about the proportions of fifty-five per cent. of carbonate of lime and about forty-five per cent. of carbonate of magnesia, and both the magnesia and the lime are the equivalents of lime in this compound as refractory agents; but the magnesia gives to the compound the additional quality of hardening into a hard and non-friable mass when dried at the ordinary temperature, which enables it to be handled and used without danger of breaking or the necessity of burning.

I am aware that lime has been used in solution in small proportions with water as a binding agent for silica, and do not claim the same.

What I claim, and desire to secure by Letters Patent, is—

The compound for furnace-linings and fire-brick, consisting of silica and magnesian lime and water in the proportions specified and set forth.

JAMES HENDERSON.

Witnesses:
W. L. BENNEM,
G. G. FRELINGHUYSEN.